(12) United States Patent
Kennedy et al.

(10) Patent No.: US 8,985,009 B2
(45) Date of Patent: Mar. 24, 2015

(54) SLIDING ELEMENT WITH EXPOSED FUNCTIONAL SURFACE

(75) Inventors: Marcus Kennedy, Dusseldorf (DE); Marc-Manuel Matz, Friedberg (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 719 days.

(21) Appl. No.: 13/259,968

(22) PCT Filed: Jan. 25, 2010

(86) PCT No.: PCT/EP2010/050779
§ 371 (c)(1),
(2), (4) Date: Sep. 23, 2011

(87) PCT Pub. No.: WO2010/136223
PCT Pub. Date: Dec. 2, 2010

(65) Prior Publication Data
US 2012/0067203 A1    Mar. 22, 2012

(30) Foreign Application Priority Data

May 27, 2009    (DE) .................. 10 2009 022 804

(51) Int. Cl.
| F16J 1/06 | (2006.01) |
| F01B 3/00 | (2006.01) |
| C23C 4/08 | (2006.01) |
| C23C 4/18 | (2006.01) |
| F16C 33/10 | (2006.01) |
| F16C 33/12 | (2006.01) |
| F16J 1/02 | (2006.01) |
| F16J 9/26 | (2006.01) |
| F16J 10/04 | (2006.01) |

(52) U.S. Cl.
CPC ... *C23C 4/08* (2013.01); *C23C 4/18* (2013.01); *F16C 33/1075* (2013.01); *F16C 33/12* (2013.01); *F16J 1/02* (2013.01); *F16J 9/26* (2013.01); *F16J 10/04* (2013.01); *F16C 2204/20* (2013.01)
USPC ................................. 92/223; 92/71

(58) Field of Classification Search
CPC .............. F02B 75/08; B22F 3/12; B22F 3/26; B32B 9/00
USPC ........ 92/223, 71; 123/668; 427/448, 454, 455
See application file for complete search history.

(56) References Cited

U.S. PATENT DOCUMENTS

| 2,588,422 | A | * | 3/1952 | Shepard .................... 138/145 |
| 3,911,891 | A | * | 10/1975 | Dowell ...................... 123/669 |
| 4,612,256 | A | * | 9/1986 | Neuhauser et al. ........... 428/547 |
| 4,798,770 | A | * | 1/1989 | Donomoto et al. ........... 428/547 |

(Continued)

FOREIGN PATENT DOCUMENTS

| DE | 19506568 | 8/1996 |
| EP | 0411322 | 2/1991 |

(Continued)

*Primary Examiner* — Edward Look
*Assistant Examiner* — Daniel Collins
(74) *Attorney, Agent, or Firm* — Robert L. Stearns; Dickinson Wright, PLLC

(57) ABSTRACT

The invention relates to a sliding element, which comprises a support and a coating applied by means of thermal spraying on the support, wherein the coating comprises at least two phases and at least one of the at least two phases is recessed in respect of the other phase of phases.

16 Claims, 1 Drawing Sheet

(56) References Cited

U.S. PATENT DOCUMENTS

| | | | |
|---|---|---|---|
| 5,305,726 A * | 4/1994 | Scharman et al. | 123/668 |
| 5,592,927 A * | 1/1997 | Zaluzec et al. | 123/668 |
| 6,361,877 B1 * | 3/2002 | Miyai et al. | 428/546 |
| 7,332,199 B2 * | 2/2008 | Aram | 427/449 |
| 7,947,372 B2 * | 5/2011 | Dekempeneer | 428/408 |
| 2007/0141270 A1 * | 6/2007 | Sherman | 427/446 |
| 2008/0163751 A1 * | 7/2008 | Subramanian et al. | 92/223 |

FOREIGN PATENT DOCUMENTS

| | | |
|---|---|---|
| EP | 0449356 | 10/1991 |
| EP | 0770698 | 5/1997 |
| WO | 9716577 | 5/1997 |
| WO | 9716578 | 5/1997 |

* cited by examiner

FIG. 1
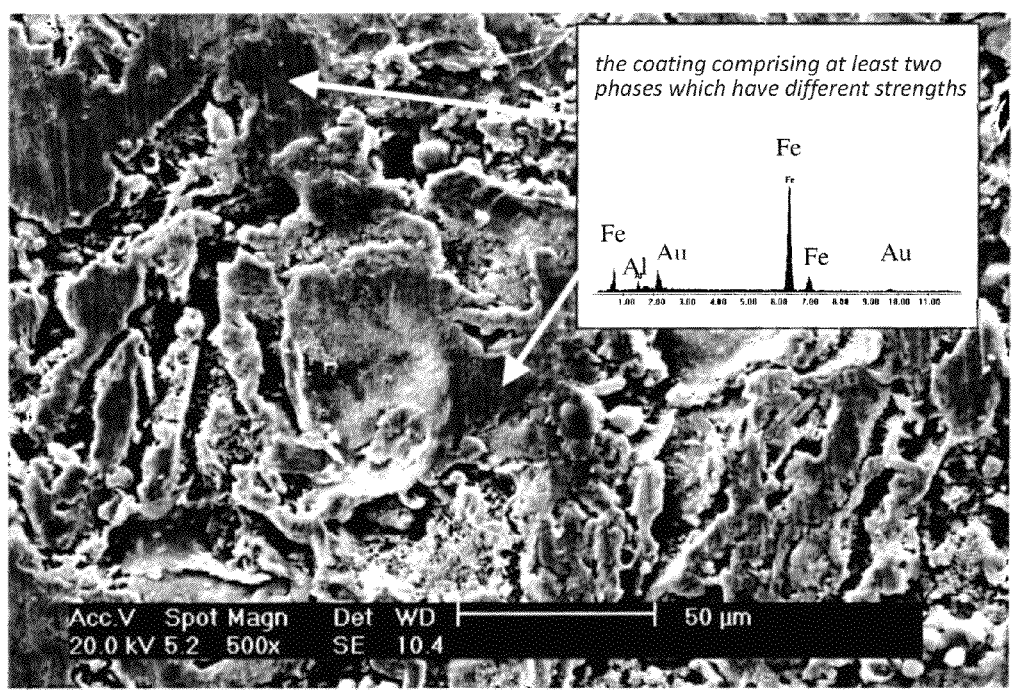
FIG. 2
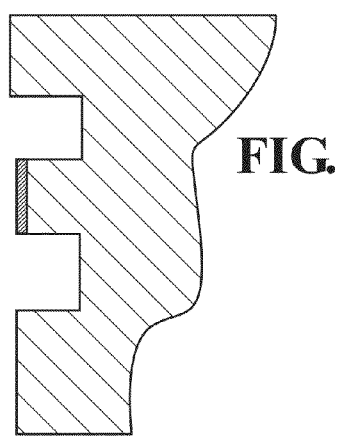
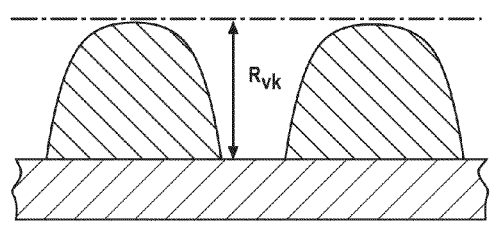
FIG. 3

SLIDING ELEMENT WITH EXPOSED FUNCTIONAL SURFACE

BACKGROUND OF THE INVENTION

1. Technical Field

The present invention relates to a sliding element, in particular for an internal combustion engine, with a thermally sprayed coating, which comprises an exposed functional surface.

2. Related Art

In the area of the crank drive, great demands are nowadays made on the components thereof in terms of wear properties, thermal conductivity, strength and weight. For this reason, these components are increasingly produced from light metals. Mixed friction up to solid friction occurs at the contact surfaces, which can lead to high frictional losses as well as a high degree of wear (e.g. micro-welding by metal transfer from aluminium surfaces of the contact partners).

The composite structure has thus become the focus of development. To this end, thermal spraying offers excellent possibilities. By means of this process, it is possible to produce cost-effectively functional surfaces which meet these requirements and, moreover, improve the tribological properties of components in contact with one another.

Several thermally sprayed functional surfaces are currently known in technology, fully sprayed liners, thermally sprayed inner coatings and thermally sprayed annular groove reinforcements. So-called pseudo-alloys find application here. These are spray material structures, which comprise two or more different material phases in order to combine the advantages of the individual materials. A material phase usually comprises a light metal, such as for example an aluminium-based alloy, as well as at least one further, usually high-strength phase, such as for example silicon carbide.

It is known to obtain a communicating system, for example on cylinder running paths of internal combustion engines, by honing. Intersecting grooves thereby arise, which are connected to one another at the intersecting regions and thus constitute an open system overall. A drawback here is that an element sliding on the sliding surface, for example a piston ring of a piston of an internal combustion engine, pushes ahead of it the oil present in the grooves, instead of building up a hydrodynamic oil pressure. A mixed friction between the sliding partners involved thus arises at the groove edges.

SUMMARY OF THE INVENTION

The invention involves producing the materials of the contact surfaces as well as the contact surfaces themselves in such a way that optimum tribological properties with correspondingly required physical properties are constituted.

According to a first aspect of the invention, a sliding element is made available, comprising:
  a support; and
  a coating applied on the support by means of thermal spraying; wherein
  the coating comprises at least two phases; and
  at least one of the at least two phases is recessed with respect to the other phase or phases.

According to an embodiment, the sliding element is a piston ring, a bearing shell, a liner or a piston.

According to an embodiment, the at least two phases have different strengths, and the recessed phase has the lowest strength.

The solution to the problem consists in changing the thermally sprayed running surfaces in such a way that the light metal phase is recessed with respect to the more wear-resistant phase, as a result of which the service life is lengthened. Furthermore, additional micro-chamber pressure systems arise through the recessing, the effect of which is that the share of the hydrodynamic friction can be increased during the operation.

The application of a thermal spray layer, which is partially recessed by additional processes and thereby exposed, leads to the constitution of a new component. The component is constituted for example as a sliding element such as, for example, a piston ring, a liner, a bearing shell or a piston groove reinforcement.

According to an embodiment,
  the recessed phase comprises a metal-based alloy; and
  the element most frequently occurring in the recessed phase has an ordinal number <14 from the periodic table.

According to an embodiment, the exposure of the recessed phase takes place mechanically or chemically.

According to an embodiment, the exposure depth, defined over the reduced groove depth $R_{vk}$ of the recessed phase, amounts to 0.5 µm-6 µm.

According to an embodiment, the sliding element is a piston ring, which is produced from casting material or steel.

According to an embodiment, the sliding element is a piston which is produced from an aluminium-based or magnesium-based alloy.

According to an embodiment, the piston is cast or forged.

According to an embodiment,
  the piston comprises at least one annular groove; and
  at least one annular groove is provided with the coating.

According to an embodiment,
  the piston comprises at least two annular grooves; and
  the web between the at least two annular grooves is provided with the coating.

According to a second aspect of the invention, a method for producing a sliding element is made available, comprising:
  making available a support;
  application, by means of thermal spraying, of a coating on the support, wherein the coating comprises at least two phases; and
  recessing of at least one of the at least two phases with respect to the other phase or phases.

According to an embodiment, the sliding element is a piston ring, a bearing shell, a liner or a piston.

According to an embodiment, the at least two phases have different strengths, and the recessed phase has the lowest strength.

According to an embodiment,
  the recessed phase comprises a metal-based alloy; and
  the element most frequently occurring in the recessed phase has an ordinal number <14 from the periodic table.

According to an embodiment, the exposure of the recessed phase takes place mechanically or chemically.

According to an embodiment, the exposure depth, defined over the reduced groove depth $R_{vk}$ of the recessed phase, amounts to 0.5 µm-6 µm.

According to an embodiment, the sliding element is a piston ring and is produced from a casting material or steel.

According to an embodiment, the sliding element is a piston and is produced from an aluminium-based or magnesium-based alloy.

According to an embodiment, the piston is cast or forged.

According to an embodiment,
  at least one annular groove is provided in the piston; and
  at least one annular groove is provided with the coating.

According to an embodiment,
  at least two annular grooves are provided in the piston; and the web between the at least two annular grooves is provided with the coating.

BRIEF DESCRIPTION OF THE DRAWING

The invention is described below with the aid of examples of embodiment, making reference to the appended drawing, in which FIG. 1 shows an exposed thermally sprayed coating according to an embodiment.

FIG. 2 shows a fragmentary view of an exemplary piston including a pair of annular grooves and a web that is disposed between the annular grooves.

FIG. 3 shows a fragmentary, cross-sectional and enlarged view of an exemplary piston including a coating with an exposed but recessed layer and an other layer.

DETAILED DESCRIPTION

FIG. 1 shows a photograph of a thermally sprayed layer for a sliding element after exposure of the aluminium-based matrix. Here, an aluminium matrix has been recessed with respect to an iron matrix. The exposure depth, defined over the reduced groove depth $R_{vk}$, amounts to 5 μm.

The invention claimed is:

1. A sliding element in the form of a piston or piston ring, comprising:
   a support; and
   a coating applied on the support by means of thermal spraying; wherein
   the coating comprises at least two layers which have different mechanical strengths;
   one of the at least two layers is recessed with respect to the other layer or layers and exposed, wherein the recessed layer has the lowest strength;
   the recessed layer comprises a metal-based alloy; and
   the element most frequently occurring in the recessed layer has an ordinal number <14 from the periodic table.

2. The sliding element of claim 1, wherein the recessed layer is exposed mechanically or chemically.

3. A sliding element in the form of a piston or piston ring, comprising:
   a support; and
   a coating applied on the support by means of thermal spraying; wherein
   the coating comprises at least two layers which have different mechanical strengths;
   one of the at least two layers is recessed with respect to the other layer or layers and exposed, wherein the recessed layer has the lowest strength;
   the recessed layer is exposed mechanically or chemically; and
   the exposure depth, provided over the reduced groove depth $R_{vk}$ of the recessed layer, is 0.5 μm -6 μm.

4. The sliding element of claim 1, wherein the sliding element is the piston ring and is produced from casting material or steel.

5. The sliding element of claim 1, wherein the sliding element is the piston and is produced from an aluminium-based or magnesium-based alloy.

6. The sliding element of claim 5, wherein the piston is cast or forged.

7. The sliding element of claim 5, wherein the piston comprises at least one annular groove; and at least one annular groove is provided with the coating.

8. The sliding element of claim 7, wherein the piston comprises at least two annular grooves; and the web between the at least two annular grooves is provided with the coating.

9. A method for producing a sliding element in the form of a piston or piston ring, comprising:
   providing a support;
   applying, by means of thermal spraying, a coating on the support, wherein the coating comprises at least two layers which have different mechanical strengths;
   recessing one of the at least two layers with respect to the other layer or layers, wherein the recessed layer has the lowest strength, and wherein both of said layers are exposed; and wherein
   the recessed layer comprises a metal-based alloy; and
   the element most frequently occurring in the recessed layer has an ordinal number <14 from the periodic table.

10. The method according to claim 9, wherein the exposure of the recessed layer takes place mechanically or chemically.

11. The method according to claim 9, wherein an exposure depth of the recessed layer, defined over a reduced groove depth $R_{vk}$ of the recessed layer, amounts is 0.5 μm -6 μm.

12. The method of claim 9, wherein the sliding element is the piston ring and, wherein the piston ring is produced from casting material or steel.

13. The method of claim 9 wherein the sliding element is the piston and, wherein the piston is produced from an aluminum-based or magnesium-based alloy.

14. The method according to claim 13, wherein the piston is cast or forged.

15. The method according to claim 13, wherein at least one annular groove is provided in the piston; and at least one annular groove is provided with the coating.

16. The method according to claim 15, wherein at least two annular grooves are provided in the piston; and the web between the at least two annular grooves is provided with the coating.

* * * * *